OWEN & PICKERING.
Lid Lifter.
No. 61,240.
Patented Jan. 15, 1867.
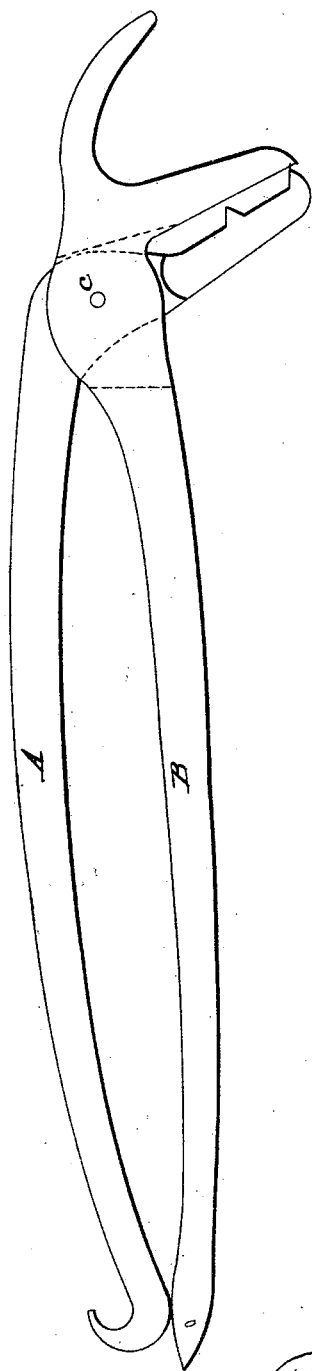
Witnesses:
Inventors:
Barton Pickering
Benjamin Owen

United States Patent Office.

BENJAMIN OWEN AND BARTON PICKERING, OF DAYTON, OHIO.

Letters Patent No. 61,240, dated January 15, 1867.

---

COMBINED TONGS, LID LIFTER, HOOK, &c.

---

*The Schedule referred to in these Letters Patent and making part of the same.*

---

TO ALL WHOM IT MAY CONCERN:

Be it known that we, BENJAMIN OWEN and BARTON PICKERING, of Dayton, in the county of Montgomery, and State of Ohio, have invented a Combined Double Tongs Stove Hook and Lid Lifter; and we do hereby declare that the following is a full and exact description thereof, reference being had to the accompanying drawings, and to the letters of reference marked thereon.

The nature of our invention consists in combining in one implement two tongs, or one tongs, a pincher, a lid lifter, and a bail hook.

To enable others skilled in the art to make and use our invention, we will proceed to describe its construction and operation.

The figure represents a side view of the implement.

The implement is composed of two distinct parts; the part A has a jaw with two projections on one end of the handle, which jaw is set at an angle with the handle approximating a right angle, the jaw inclining outward from the handle, and in the opposite end of the handle is a hook, bent outward, which is used for a bail hook. The part B has also a jaw, which is set at about the same angle as the jaw of the part A, with reference to the handle. The jaw is at the end of the handle, and at the intersection of the jaw and handle is a lid lifter, which curves from a line parallel with the handle towards the jaw. On the opposite end of this handle is a part like the end of a pair of tongs, which is made slightly concave, to hold the more effectually; and this, with the hooked end of the part A, serves as a pair of tongs. The two parts are cast, and the part A is passed through a slot of the part B, and is fastened by the rivet c; the two jaws thus brought together form a pinchers, or tongs, used to handle bake and stew pans.

We are aware that a lid lifter has been made with two sets of pinchers like jaws, and with hooks turning inward upon the ends of the handles; therefore we limit our claims to the new manufacture above described.

What we claim, and desire to secure by Letters Patent of the United States, is—

The above described lid lifter as a new article of manufacture, the same being constructed and used substantially in the manner and for the purposes set forth.

BARTON PICKERING,
BENJAMIN OWEN.

Witnesses:
FRANK R. MORRISON,
LEVI WENGER.